United States Patent [19]

Yamada

[11] Patent Number: 4,597,466

[45] Date of Patent: Jul. 1, 1986

[54] AIR INTAKE APPARATUS FOR VEHICLE

[75] Inventor: Kozo Yamada, Saitama, Japan

[73] Assignee: Honda Giken Kogyo Kabushiki Kaisha, Tokyo, Japan

[21] Appl. No.: 737,654

[22] Filed: May 23, 1985

[30] Foreign Application Priority Data

May 28, 1984 [JP] Japan .................................. 59-107946

[51] Int. Cl.⁴ .............................................. B62J 17/06
[52] U.S. Cl. ..................................... 180/225; 180/215; 280/282
[58] Field of Search ............... 180/225, 219, 296, 215, 180/217; 280/282; 55/385 B, DIG. 28

[56] References Cited

U.S. PATENT DOCUMENTS

| 4,191,269 | 3/1980 | Nagashima et al. | 280/282 |
| 4,321,978 | 3/1982 | Tominaga et al. | 180/225 |
| 4,392,536 | 7/1983 | Iwai et al. | 280/282 |
| 4,484,651 | 11/1984 | Hattori et al. | 180/225 |
| 4,496,019 | 1/1985 | Tanaka | 180/225 |
| 4,531,606 | 7/1985 | Watanabe | 180/215 |

Primary Examiner—John J. Love
Assistant Examiner—Donn McGiehan
Attorney, Agent, or Firm—Lyon & Lyon

[57] ABSTRACT

An air intake passage formed inside a main pipe which constitutes a portion of a body frame of a vehicle. An air chamber which provides communication between the air intake passage and an air cleaner is formed by utilizing the inside of a gusset which is provided to reinforce the connection between the main pipe and a pair of center pipes extending rearwardly from the main pipe on the right and left sides, respectively.

5 Claims, 8 Drawing Figures

4,597,466

AIR INTAKE APPARATUS FOR VEHICLE

BACKGROUND OF THE INVENTION

1. Field of the Invention

The field of the present invention relates to air intake apparatus for a vehicle, particularly a motorcycle or a motor-tricycle, in which a portion of the body frame is utilized as a passage for the intake air which is introduced into an engine mounted thereon.

2. Description of the Prior Art

One type of vehicle has heretofore been arranged such that a portion of the body frame is utilized as a passage for the intake air which is introduced into an engine mounted thereon. Such an earlier device prior art has been disclosed, for example, in the specification of Japanese Utility Model Publication No. 39758/78.

To increase the output performance of vehicles of the type described above, it is general practice to employ an engine having a large piston displacement. Employment of such an engine requires more intake air; consequently, it is necessary to increase the capacity of the air intake passage formed in the body frame correspondingly.

To increase the capacity of the air intake passage in the above-described prior art, it is necessary to form the main pipe used as the air intake passage with as large a diameter as possible. However, as the diameter of the main pipe is increased, the following problems arise:

(1) It becomes more difficult to weld the main pipe together with another constituent member of the body frame such as a head pipe.
(2) Bending the main pipe limits the capacity of the air intake passage.
(3) Increasing the diameter of the main pipe unfavorably increases the weight of the body frame.

SUMMARY OF THE INVENTION

It is a primary object of the present invention to provide an air intake apparatus for a vehicle with a simple construction which overcomes all the above-described disadvantages of the prior art.

To this end, an air intake passage extends through a main frame pipe of a vehicle to a chamber formed by a gusseted portion of the frame. The gusseted portion is located at the back end of the main frame pipe between twin center pipes. The chamber is in communication with an adjacent air cleaner which in turn communicates with the engine.

By virtue of the above-described arrangement, it is possible for the air intake passage and the air chamber to cooperate in such a manner as to ensure a relatively large air intake capacity to satisfactorily be used with an engine having a relatively large piston displacement. Consequently, the intake efficiency of the engine may be greatly enhanced. Further, the gusset serves as a member for reinforcing the connection between the main pipe and the center pipes to strengthen the body frame reduced to reduce the weight of the body frame.

Moreover, by using the gusset as the air chamber, it is possible to change, as desired, the course of the intake passage of the engine without bending the main pipe. This is advantageous in terms of the layout of such devices as the intake pipe, the carburetor and so forth, as well as the appearance of the vehicle as a whole.

The above and other objects, features and advantages of the present invention will become clear from the following detailed description of the preferred embodiments thereof, taken in conjunction with the accompanying drawings.

BRIEF DESCRIPTION OF THE DRAWINGS

The accompanying drawings in combination show embodiments of the air intake apparatus according to the present invention, in which.

DESCRIPTION OF THE PREFERRED EMBODIMENTS

Preferred embodiments of the present invention will be described hereinunder with reference to the accompanying drawings.

FIGS. 1 to 5 in combination show a first embodiment of the present invention in which the invention is applied to a motor-tricycle.

Figure 1:
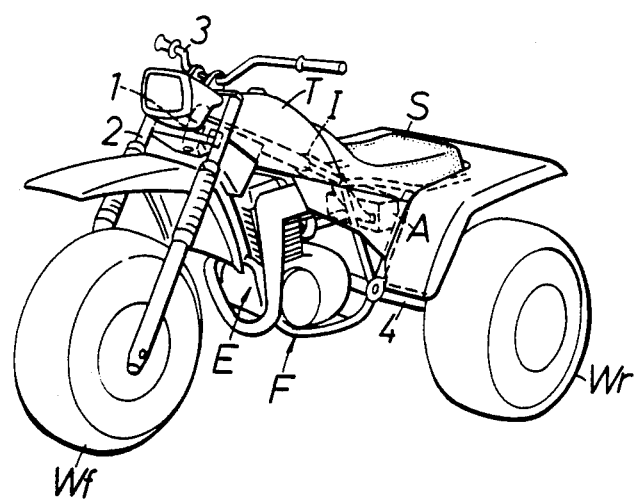
FIG. 1 is a perspective view of a motor-tricycle equipped with an air intake apparatus in accordance with a first embodiment of the present invention.
Figure 2:
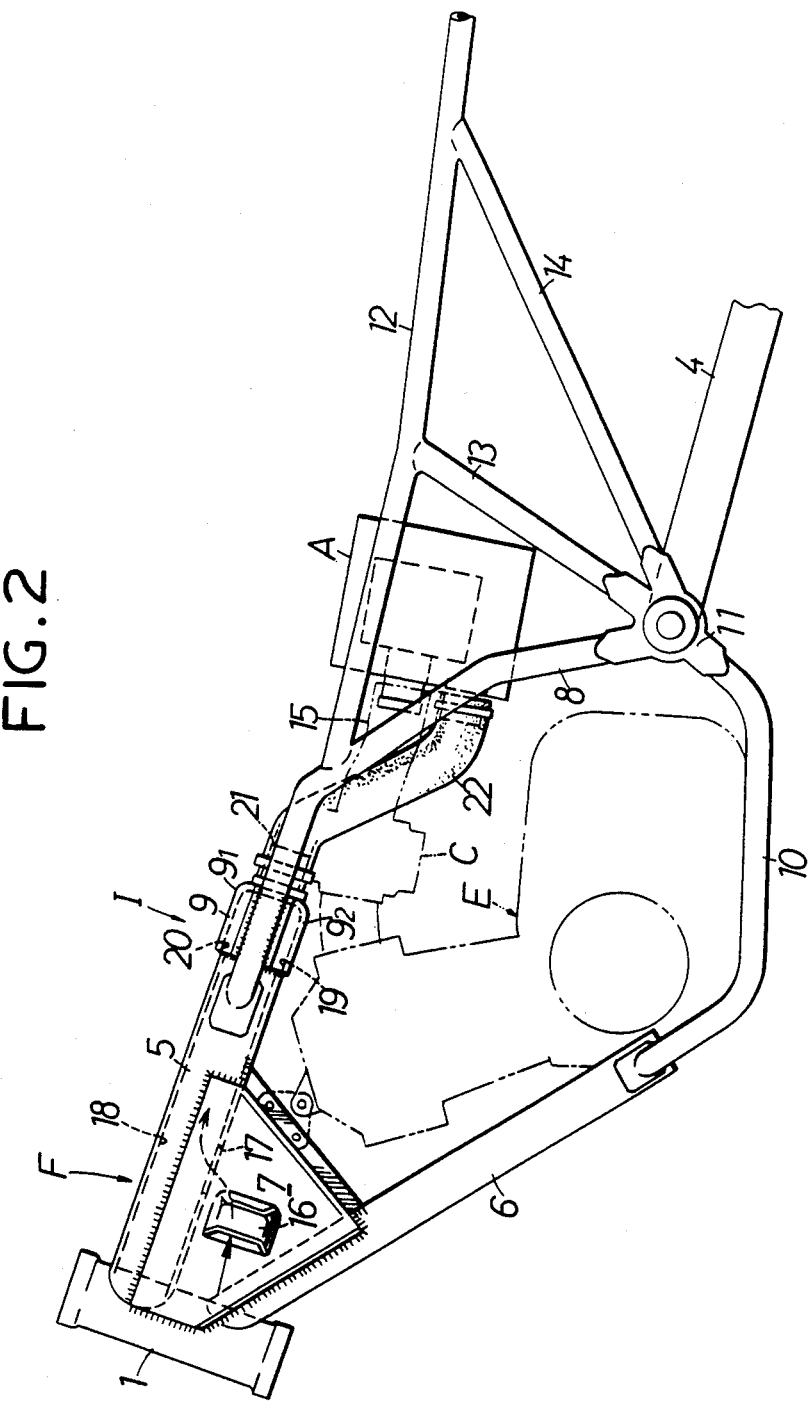
FIG. 2 is a side elevational view of an essential portion of the motor-tricycle shown in FIG. 1.
Figure 3:
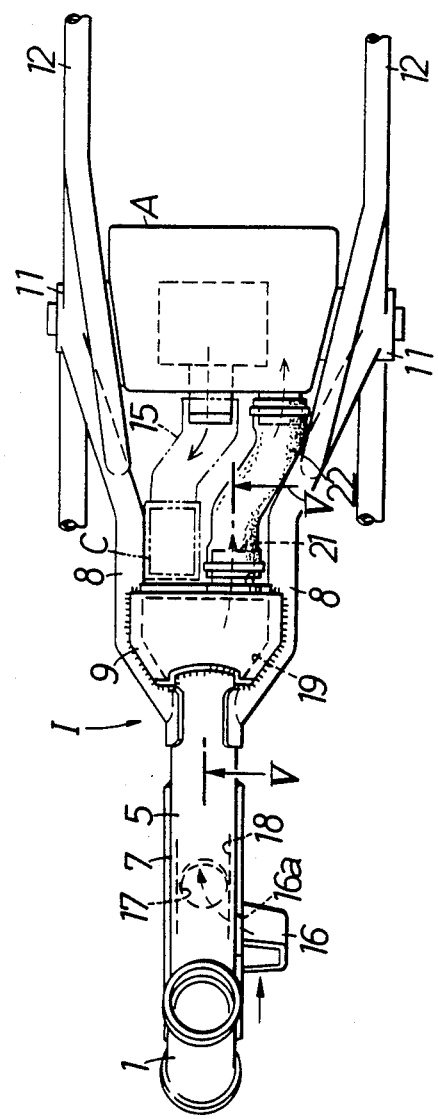
FIG. 3 is a plan view of the essential portion shown in FIG. 2.
Figure 4:
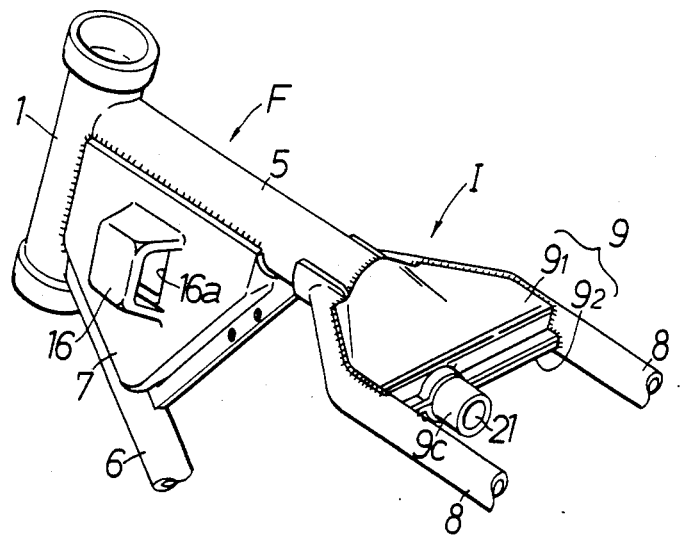
FIG. 4 is a perspective view of a portion of a body frame of the motor-tricycle shown in FIG. 1.
Figure 5:
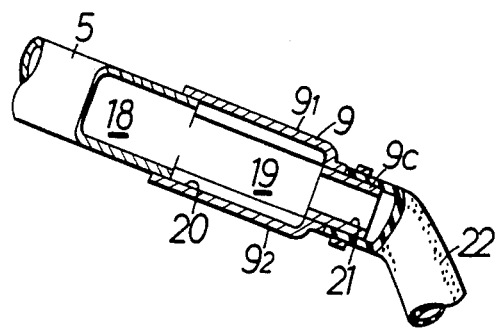
FIG. 5 is a sectional view taken along the line V—V of FIG. 3.

Referring first to FIG. 1, a body frame F has a head pipe 1 disposed at its front end. The head pipe 1 steerably supports a front fork 2 which suspends a front wheel Wf equipped with a balloon tire. A steering handle 3 is mounted on the upper portion of the front fork 2. Further, at the rear portion of the body frame F, a rear fork 4 is pivotally mounted about an axis transverse to the vehicle. The rear fork 4 suspends a pair of right and left rear wheels Wr, Wr each equipped with a balloon tire.

In the center of the body frame F, an engine E is suspended for driving the rear wheels Wr, Wr. Further, a fuel tank T and a seat S are mounted on the body frame F in series in the longitudinal direction thereof. A driver straddles the seat S.

The construction of the body frame F will be explained hereinafter with reference to the Figures, mainly FIGS. 2 to 5. The respective front ends of a main pipe 5 and a lower tube 6 are welded to the rear surface of the head pipe 1 which steerably supports the front fork 2. A reinforcing plate 7 is welded to these three members, whereby they are reinforced by each other. The main pipe 5 extends rearwardly from the head pipe 1 at a slight downward incline, and the lower tube 6 extends rearwardly from the head pipe 1 in an obliquely downward direction. The front ends of a pair of right and left center pipes 8, 8 are welded to both sides of the rear end portion of the main pipe 5. A gusset 9, described later in detail, is welded to the rear end of the main pipe 5 and the respective front end portions of the right and left center pipes 8, 8, whereby these members are reinforced by each other. The center pipes 8, 8 extend rearwardly in an obliquely downward direction. Further, the respective front ends of a pair of right and left down pipes 10, 10 are secured to the lower end portion of the lower tube 6. These lower tubes 10, 10 extend rearwardly while passing below the engine E on the right and left sides thereof, respectively. The respective lower ends of the pair of center pipes 8, 8 and the respective rear ends of the lower pipes 10, 10 are integrally welded by means of connecting stays 11. The respective front ends of seat frames 12 for mounting the seat S are welded to respective intermediate portions of the pair of center pipes 8, 8. Further, reinforcing back stays 13, 14 are welded between the seat frames 12 and the connecting stays 11.

The engine E is accommodated in a space defined by the main pipe 5, the pair of right and left center pipes 8, 8, the lower tube 6 and the pair of right and left lower pipes 10, 10. An intake pipe 15 is connected to an intake port which is formed in the rear surface of the engine E. The intake pipe 15 has a carburetor C interposed in its intermediate portion. Further, an air cleaner A is connected to the rear end of the intake pipe 15. The air cleaner A is supported in such a manner that it is suspended by the pair of right and left center pipes 8, 8 and the seat frames 12.

The body frame F is provided with an air intake apparatus I for introducing atmospheric air into the air cleaner A. The apparatus I will be described hereinunder.

On one side surface of the reinforcing plate 7 for reinforcing the main pipe 5 is formed a box-shaped air intake portion 16 which has its front and rear surfaces open and projects leftwardly with respect to the travelling direction of the vehicle. The inside of the air intake portion 16 is communicated with an air intake port 17 formed in the lower surface of the front end portion of the main pipe 5 through an opening 16a provided in the above-described side surface of the reinforcing plate 7. The main pipe 5 is formed into a substantially straight shape. The inside of the main pipe 5 is formed such as to define an air intake passage 18. The gusset 9, which is welded to the rear end of the main pipe 5 and the respective front end portions of the pair of right and left center pipes 8, 8, is formed into a triangular shape in plan view. The gusset 9 is formed by integrally welding respective flanged peripheral edges of gusset upper $9_1$ and a gusset lower $9_2$ each constituted by a triangular plate material. The inside of the gusset 9 is formed such as to define an air chamber 19 having a relatively large capacity. An inlet 20 of the chamber 19 which is formed on the front side thereof is communicated with the air intake passage 18. A cylindrical portion 9c projects rearwardly from the rear surface of the gusset 9, the position of the cylindrical portion 9c being eccentric in the lateral direction of the rear surface of the gusset 9, toward either the right or left side. An outlet 21 formed in the cylindrical portion 9c is communicated with the air chamber 19. The outlet 21 is connected to the inlet of the air cleaner A through an inlet tube 22. Since the outlet 21 is disposed in such a manner as to be eccentric in the lateral direction of the rear surface of the gusset 9, toward either the right or left side, it is possible to arrange the inlet tube 22 connected to the outlet 21 in parallel with the intake pipe 15 of the engine E without any interference with the latter.

The following is a description of the operation of the first embodiment.

As the engine E is run, the air entering the air intake portion 16 passes through the opening 16a and flows into the air intake passage 18 formed inside the main pipe 5 through the air intake port 17. The air flowing rearwardly through the air intake passage 18 is introduced into the air chamber 19 formed inside the gusset 9. The air introduced into the air chamber 19 passes through the inlet tube 22 and enters the air cleaner A, where it is filtered. The filtered air then flows into the intake pipe 15 and is mixed with fuel in the carburetor C to form an air-fuel mixture, which is then sucked into the engine E.

Thus, it is possible for the air intake passage 18 and the air chamber 19 to cooperate in such a manner as to ensure a relatively large air intake capacity to accommodate the engine E having a relatively large piston displacement. Consequently, it is possible to increase the intake efficiency of the engine E, and it is possible to sufficiently satisfy the need for an increase in the output of the engine E and the need for a reduction in the intake noise.

Figure 6:
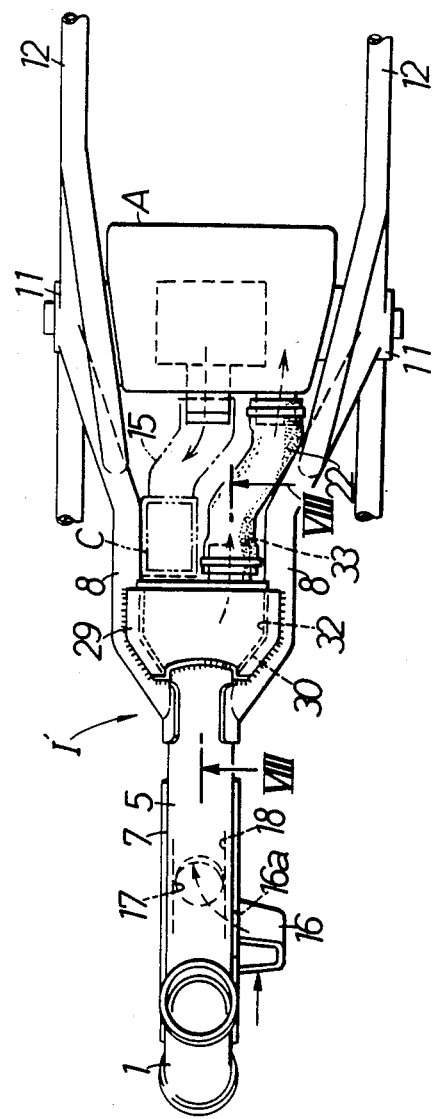
FIG. 6 is a plan view, similar to FIG. 3, of a motor-tricycle equipped with an air intake apparatus in accordance with a second embodiment of the present invention.
Figure 7:
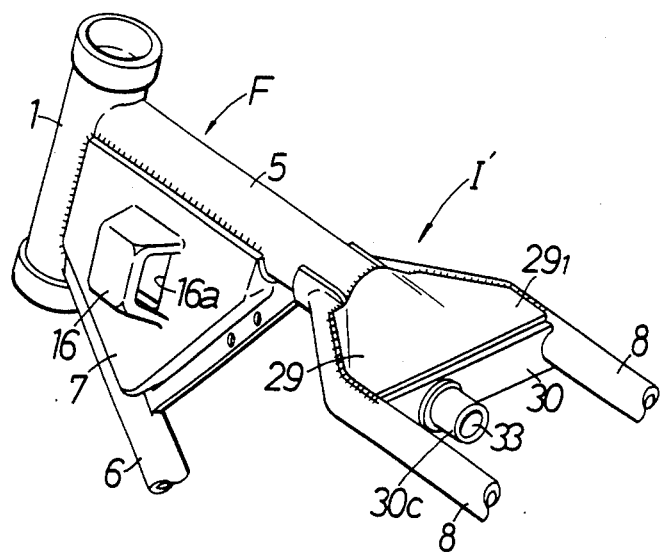
FIG. 7 is a perspective view, similar to FIG. 4, of a portion of the body frame of the motor-tricycle shown in FIG. 6.
Figure 8:
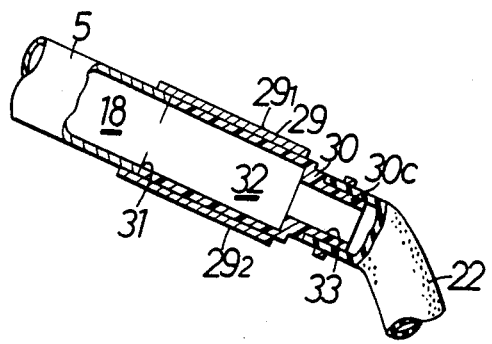
FIG. 8 is a sectional view taken along the line VIII—VIII of FIG. 6.

FIGS. 6 to 8 in combination show a second embodiment of the present invention, which is a modification obtained by partially changing the arrangement of the air intake apparatus I in accordance with the first embodiment. Therefore, the corresponding members or portions are denoted by the same reference numerals or symbols.

A gusset 29 which constitutes an essential portion of an air intake apparatus I' in accordance with the second embodiment is formed by two triangular plate materials, that is, a gusset upper $29_1$ and a gusset lower $29_2$ in such a manner that the respective peripheral edge portions of the gusset upper $29_1$ and the gusset lower $29_2$, which contact the main pipe 5 and the center pipes 8, 8, are integrally welded to the latter. An air chamber defining member 30 is fitted into the space defined between the gusset upper $29_1$ and the gusset lower $29_2$ from the open rear surface of the gusset 29 and is fixedly clamped between the gusset upper $29_1$ and the gusset lower $29_2$. The air chamber defining member 30 has a shape corresponding to the space and has an air chamber 32 defined by its inside.

The air chamber defining member 30 is made of resin. The member 30 has an inlet 31 in its front surface which is in communicaton with the air intake passage 18 in a state wherein the member 30 is fixedly clamped between the gusset upper $29_1$ and the gusset lower $29_2$. Further, a cylindrical portion 30c is integrally formed with the air chamber defining member 30 so as to project rearwardly from the rear surface thereof, the position of the cylindrical portion 30c being laterally offset from the center of the rear surface of the member 30, toward the right or left side. An outlet 33 formed in the cylindrical portion 30c is communicated with the air chamber 32 formed inside the air chamber defining member 30. Accordingly, the air introduced into the air intake passage 18 flows into the air chamber 32 from the inlet 31 and flows out from the outlet 33. The outlet 33 is connected with the inlet tube 22 in communication with the inlet of the air cleaner A in a manner similar to that in the above-described first embodiment.

As has been described above, in this embodiment, the air chamber 32 is provided by fitting the air chamber defining member 30 into the space defined between the gusset upper $29_1$ and the gusset lower $29_2$ which in combination constitute the gusset 29. The member 30 is made of and has a cylindrical portion 30c which is integrally formed therewith such as to project from the rear surface of the member 30. Therefore, it becomes unnecessary to bend the respective rear ends of the upper and lower members for constituting the gusset 29 and to weld together the rear ends and further to connect the cylindrical portion to both the members. In consequence, the operation of forming the air intake apparatus is advantageously simplified. Further, it is possible that an air chamber defining member which has an air chamber capacity corresponding to the performance of the engine mounted on the vehicle is selected and is incorporated in the gusset. Thus, the adaptability of the air intake apparatus is further improved.

It is to be noted that, although the air intake apparatus of the invention is employed in the motor-tricycle in the above-described embodiments, it is, as a matter of course, possible to apply the invention to other various types of vehicle, such as motorcycles.

What is claimed is:

1. In a vehicle in which an engine is mounted on a body frame having at least a head pipe, a main pipe extending rearwardly of said head pipe and twin center pipes respectively extending on right and left sides of said head pipe rearwardly from a forked junction at a rear end of said main pipe, between which center pipes an air cleaner connected to an intake pipe of said engine is disposed rearwardly of said engine, an air intake apparatus comprising: an air intake passage defined by the inside of said main pipe; and an air chamber defined by the inside of a gusset for reinforcing the connection between said main pipe and said pair of center pipes, said air chamber having an inlet in communication with said air intake passage and an outlet in communication with said air cleaner.

2. An air intake apparatus for a vehicle according to claim 1, wherein said outlet is laterally offset from the center of said gusset.

3. An air intake apparatus for a vehicle according to claim 1, wherein said air chamber is defined by an air chamber defining member fitted in said gusset.

4. An air intake apparatus for a vehicle according to claim 1, wherein said main pipe is provided with a reinforcing plate which has on one side surface thereof an air intake portion communicating with said air intake passage.

5. An air intake apparatus for a vehicle according to claim 3, wherein said air chamber defining member is made of resin.

* * * * *